3,718,662
MERCAPTOBENZIMIDAZOLYL UREAS
AND THIOUREAS
Venkatachala L. Narayanan, Hightstown, and Rudiger
D. Haugwitz, Highland Park, N.J., assignors to E. R.
Squibb & Sons, Inc., New York, N.Y.
No Drawing. Filed Apr. 21, 1971, Ser. No. 136,197
Int. Cl. C07d 49/38
U.S. Cl. 260—309.2                 6 Claims

ABSTRACT OF THE DISCLOSURE

Mercaptobenzimidazolyl ureas and thioureas are provided having the structure

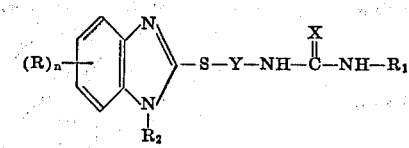

and which are useful as anthelmintic agents.

The present invention relates to mercaptobenzimidazolyl ureas and thioureas having the structure (I) 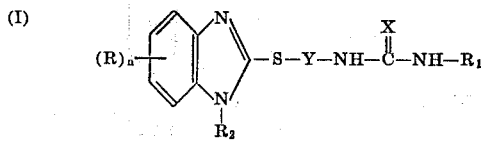

wherein X is oxygen or sulfur, R is hydrogen, lower alkyl, aryl, aralkyl, lower alkoxy, aroyl, substituted aryl, lower alkylthio, acyl, trifluoromethyl, nitro, halogen, cyano, thiocyanato, amido, substituted amino, dialkylaminoalkyl, alkyloxy- or aryloxycarbonyl

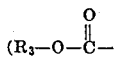

wherein $R_3$ can be lower alkyl, lower alkylaryl) or carbamate ester (—NHCOOR$_4$ wherein $R_4$ is lower alkyl, aryl, substituted aryl or cycloalkyl), $R_1$ is aryl, substituted aryl, cycloalkyl, lower alkyl, acyl or aroyl, $R_2$ is hydrogen, lower alkyl, aryl, substituted aryl, acyl, aroyl, alkoxy- or aryloxycarbonyl, carbamoyl or thiocarbamoyl

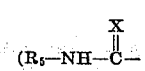

where $R_5$ is cycloalkyl, aryl, substituted aryl, alkyl, acyl, or aroyl), Y is a straight or branched chain alkylene radical containing from one to about fifteen carbon atoms and $n$ is 0, 1 or 2.

The lower alkyl groups represented by the above R, $R_1$, $R_2$, $R_3$, $R_4$ and $R_5$ groups include straight or branched chain aliphatic hydrocarbon radicals having up to and including seven carbon atoms, such as methyl, ethyl, propyl, isopropyl, butyl, s-butyl, isobutyl, t-butyl, amyl, hexyl, heptyl, and the like.

The alkylene group represents a divalent straight or branched chain aliphatic hydrocarbon and can contain from one to fifteen carbon atoms in a chain with or without side chains. The side chains can include cycloalkyl substituents. Examples of these groups include groups corresponding to the above alkyl groups as well as decylene, undecylene, dodecylene, tridecylene, tetradecylene, pentadecylene, 3-(cyclobutylmethyl)butylene and 2-cyclopropylhexylene.

The lower alkoxy group and the alkoxy portion of the alkoxycarbonyl group include straight and branched chain radicals of up to and including seven carbon atoms, corresponding to the above alkyl groups, e.g., methoxy, ethoxy, propoxy, isopropoxy, and the like. The aryloxy portion of the aryloxycarbonyl group includes any of the aryl groups set out below.

The cycloalkyl groups can have from three to about seven carbon atoms and include, for example, cyclopropyl, cyclopentyl and cycloheptyl.

The term "halogen" includes each of the four halogens, but fluorine and chlorine are preferred.

The substituted amino groups include mono- or di-lower alkyl- or arylamino where lower alkyl and aryl are as defined herein, such as methylamino, ethylamino, isopropylamino, heptylamino, dimethylamino, diethylamino, ethylmethylamino, butylmethylamino, ethyl i-propylamino, anilino, diphenylamino, naphthylamino, or N-methyl-N-phenylamino and the like.

The term "aryl" includes monocyclic or bicyclic monovalent aromatic ring systems such as phenyl or naphthyl. These aryl radicals can include as substituents halogen, nitro or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic aids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexane)pentenoic acid], and the like.

Preferred are those compounds wherein R is hydrogen or $NO_2$, $R_1$ is $C_6H_5$, p-$NO_2$—$C_6H_4$ or cyclohexyl, X is S or O, Y is —$(CH_2)_3$—, and $R_2$ is H or

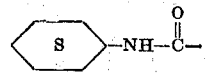

Examples of compounds falling within the present invention include, but are not limited to, the following set out in Table A which follows.

TABLE A

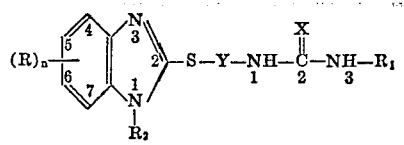

| | R(position) | n | $R_2$ | Y | X | $R_1$ |
|---|---|---|---|---|---|---|
| 1 | H | --- | H | $-(CH_2)_3-$ | S | $C_6H_5$ |
| 2 | H | --- | H | $-(CH_2)_3-$ | S | $p-NO_2-C_6H_4-$ |
| 3 | 5-$NO_2$ | 1 | H | $-(CH_2)_3-$ | S | $C_6H_5$ |
| 4 | 5-$NO_2$ | 1 | ⌬S–NH–C(=O) | $-(CH_2)_3-$ | O | ⌬S |
| 5 | {5-$C_4H_9$ / 6-$C_4H_9$} | 2 | $C_6H_5$ | $-CH_2-CH(CH_3)-$ | O | $C_3H_7$ |
| 6 | 5-$C_6H_5$ | 1 | $p-CH_3-C_6H_4-$ | $-(CH_2)_5-$ | O | $C_6H_5C(=O)$ |
| 7 | 4-$CH_3O$ | 1 | $CH_3$ | $-CH_2-C(CH_3)(H)-CH_2-$ | S | $C_6H_5C(=O)$ |
| 8 | 5,6-di-Cl | 2 | $C_6H_5C(=O)$ | $-(CH_2)_{10}-$ | O | ⌬-$CH_3$ |
| 9 | 6-$C_2H_5S-$ | 1 | $C_6H_5C(=O)$ | $-(CH_2)_{14}-$ | S | [S-ring] |
| 10 | 4-$(CH_3)_2N-$ | 1 | $C_2H_5OC(=O)$ | $-(CH_2)_2-C(C_2H_5)(CH_3)-(CH_2)_2-$ | O | $C_2H_5$ |
| 11 | $C_2H_5$, 6-N(CH_3)-$C_2H_4-$ | 1 | $C_6H_5-NH-C(=O)-$ | $-CH_2CH(C_3H_7)-$ | S | $C_6H_5$ |
| 12 | 7-CN | 1 | $C_3H_7-NH-C(=S)$ | $-(CH_2)_3-$ | O | ⌬S |
| 13 | 6-$CH_3OC(=O)$ | 1 | H | $-(CH_2)_5-$ | S | $CH_3-C(=O)$ |
| 14 | 5-$C_4H_9C(=O)$ | 1 | $C_6H_{13}$ | $-(CH_2)_6-$ | O | $C_6H_5$ |
| 15 | 4-NCS- | 1 | $C_6H_5O-NH-C(=O)$ | $-CH_2-C(CH_3)(C_4H_9)-CH_2-$ | S | $C_5H_{11}$ |
| 16 | 5-$CH_2OC(=O)NH-$ | 1 | H | $-(CH_2)_4-$ | O | [S-ring] |
| 17 | 6-$C_6H_5C(=O)$ | 1 | $C_6H_5$ | $-CH_2-$ | S | $C_4H_9$ |
| 18 | 5-$CH_3C(=O)NH-$ | 1 | $C_3H_7$ | $-CH_2-$ | O | $C_6H_5$ |
| 19 | 6-$C_6H_5-C(=O)-NH-C(=S)-$ | 1 | H | $-(CH_2)_2-$ | S | $C_6H_5$ |

Compounds of Formula I wherein $R_2$ is hydrogen, lower alkyl, aryl or substituted aryl can be prepared by reacting a mercaptobenzimidazole of the structure II  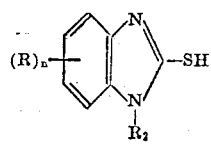

wherein $R_2$ is H, alkyl, aryl or substituted aryl, with a haloalkylamine hydrobromide of the structure III 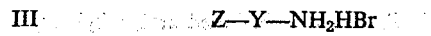

wherein Z is Br or Cl, employing a molar ratio of II:III of within the range of from about 1.5:1 to about 1:1 and preferably 1:1 to form an aminoalkylthiobenzimidazole of the structure

IV

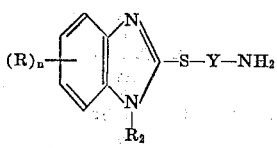

The reaction of II and III is carried out in protic or aprotic solvents such as alkanols of up to nine carbon atoms, acetone, benzene and tetrahydrofuran employing temperatures of within the range of from about 60° to about 150° C. and preferably from about 70° to about 100° C., for periods ranging from 30 minutes to about 24 hours and preferably from about 30 minutes to about 10 hours.

Compound IV can then be reacted with an isocyanate or isothiocyanate of the structure

V

to form compounds of Formula I. This reaction is carried out at a temperature ranging from about 0 to about 140° C. and preferably from about 20 to about 90° C., for periods ranging from about 30 minutes to about 24 hours and preferably from about 30 minutes to about 12 hours in the presence of solvents such as alkanols of up to nine carbon atoms, esters such as ethyl acetate, ethers such as tetrahydrofuran, ketones such as ethylmethyl ketone and aromatic hydrocarbons such as benzene, toluene and xylene. Compound IV is reacted in a molar ratio to compound V (IV:V) of within the range of from about 1.5:1 to about 1:1, preferably 1:1.

Compounds of Formula I where $R_2$ is carbamoyl or thiocarbamoyl

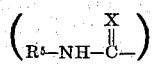

are prepared by reacting a compound of Formula I where $R_2$ is H, that is (VI)

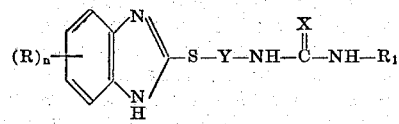

with an isocyanate or isothiocyanate of the structure (VII)

Where

is the same as

a molar ratio of VI:VII within the range of from about 1:1 to about 1:50 and preferably from about 1:2 to about 1:5 is utilized. Such compounds (i.e., where

is the same as

are preferably prepared by reacting a compound of the structure IV with an excess of isocyanate or isothiocyanate VII. Where

is other than

a molar ratio of VI:VII of from about 1:1 to about 1:50 and preferably about 1:1 is employed. Any of the solvents mentioned above with respect to the reaction of compounds IV and V can be employed. The reaction of VI and VII is carried out at a temperature within the range of from about 0 to about 140° C. and preferably from about 20 to about 90° C. for periods ranging from about 30 minutes to about 24 hours and preferably from about 30 minutes to about 12 hours.

Compounds of Formula I where $R_2$ is alkoxycarbonyl, aryloxycarbonyl, acyl or aroyl can be prepared by reacting Compound VI with a halide of the structure (VIII)          $R_2Hal$ where $R_2$ is alkoxycarbonyl, aryloxycarbonyl, acyl or aroyl, in the presence of a basic catalyst, such as triethylamine, N,N-dimethylaniline or N-ethylpiperidine in the presence of a solvent such as employed in the reaction of Compounds IV and V. A molar ratio of VI:VIII within the range of from about 1:1 to about 1:100 and preferably from about 1:1 to about 1:20 is employed. The reaction is carried out at a temperature within the range of from about 15 to about 120° C. and preferably from about 20 to about 80° C. for periods ranging from about 15 minutes to about 8 hours and preferably from about 30 minutes to about 6 hours.

The mercaptobenzimidazole II starting material can be prepared by reacting an o-phenylenediamine (IX)

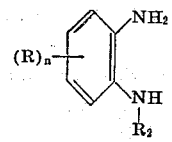

with, for example, potassium, ethyl xanthate in accordance with the procedure described in "Organic Synthesis" Col. Vol. IV, p. 569 to form the mercaptobenzimidazole II

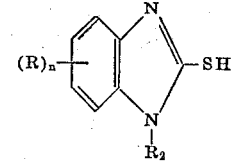

Examples of suitable starting o-phenylenediamines II are set out in Table B below.

TABLE B

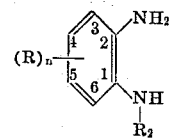

| R (position) | n | $R_2$ |
|---|---|---|
| 1. H | | H |
| 2. $C_2H_5\overset{O}{\overset{\|}{C}}$ (4) | 1 | $CH_3$ |
| 3. $C_2H_5\overset{O}{\overset{\|}{C}}NH-$ (4) | 1 | $C_6H_5$ |
| 4. $C_2H_5-$ (5) | 1 | $p\text{-}CH_3C_6H_4-$ |
| 5. {Br (5), Br (6)} | 2 | $CH_3\overset{O}{\overset{\|}{C}}-$ |
| 6. $CH_3NH-$ (6) | 1 | $C_6H_5\overset{O}{\overset{\|}{C}}$ |
| 7. $(C_4H_9)_2N-$ (4) | 1 | H |
| 8. $(C_2H_5)_2NCH_2-$ (5) | 1 | $C_6H_5CH_2-$ |
| 9. $C_6H_5O\overset{O}{\overset{\|}{C}}-$ (4) | 1 | H |

TABLE B—Continued

| | R (position) | n | R₂ |
|---|---|---|---|
| 10 | CF₃ | 1 | C₅H₁₁ |
| 11 | {CH₃S (3), C₂H₅ (5)} | 2 | C₃H₇ |
| 12 | C₄H₉ (5) | 1 | C₆H₁₃ |
| 13 | NO₂ (5) | 1 | C₆H₅ |
| 14 | —SCN (6) | 1 | C₆H₅CH₂— |
| 15 | {Cl (4), CH₃ (5)} | 2 | C₆H₅ |
| 16 | C₆H₅CH₂— (4) | 1 | H |
| 17 | —CN (5) | 1 | H |
| 18 | C₆H₅ (3) | 1 | C₂H₅ |
| 19 | CH₃—C₆H₄— (4) | 1 | CH₃ |
| 20 | $\underset{\text{C}_2\text{H}_5\overset{\text{O}}{\underset{\|}{\text{C}}}\text{ (4)}}{}$ | 1 | H |
| 21 | —NHCOOC₃H₇ (5) | 1 | $\text{C}_6\text{H}_5\overset{\text{O}}{\underset{\|}{\text{C}}}-$ |
| 22 | —NHCOOC₆H₅ (6) | 1 | H |
| 23 | —NHCOO—⟨S⟩ (7) | 1 | H |

Examples of suitable haloalkylamine hydrobromides III include, but are not limited to, the following:

Br—CH₂—NH₂HBr

Br—(CH₂)₂—NH₂HBr $\text{Br—CH}_2\text{—}\underset{\underset{\text{CH}_3}{|}}{\text{CH}}\text{—NH}_2\text{HBr}$ $\text{Cl—(CH}_2)_2\text{—}\underset{\underset{\text{CH}_3}{|}}{\overset{\overset{\text{CH}_3}{|}}{\text{C}}}\text{—NH}_2\text{HBr}$ $\text{Br—CH}_2\text{—}\underset{\underset{\text{C}_2\text{H}_5}{|}}{\overset{\overset{\text{CH}_3}{|}}{\text{C}}}\text{—(CH}_2)_2\text{—NH}_2\text{HBr}$ Cl—(CH₂)₆—NH₂HBr Br—(CH₂)₈—NH₂HBr Br—(CH₂)₁₂—NH₂HBr Cl—(CH₂)₁₅NH₂HBr

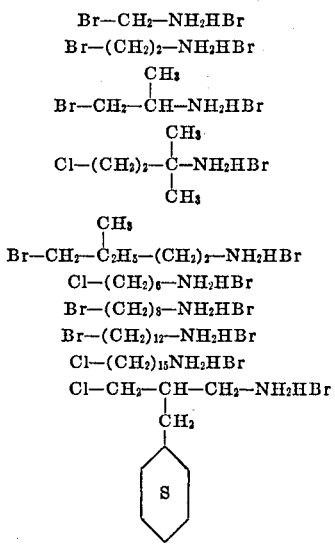

Examples of suitable isocyanates and isothiocyanates include, but are not limited to, the following:

$\text{C}_2\text{H}_5\text{N}\overset{\text{O}}{\underset{\|}{\text{C}}}$ $\text{C}_4\text{H}_9\text{N}\overset{\text{S}}{\underset{\|}{\text{C}}}$ $\text{C}_6\text{H}_5\text{N}\overset{\text{O}}{\underset{\|}{\text{C}}}$ $\text{CH}_3\text{C}_6\text{H}_4\text{N}\overset{\text{S}}{\underset{\|}{\text{C}}}$

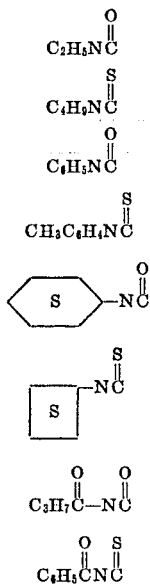

$\text{C}_3\text{H}_7\overset{\text{O}}{\underset{\|}{\text{C}}}\text{—N}\overset{\text{O}}{\underset{\|}{\text{C}}}$ $\text{C}_6\text{H}_5\overset{\text{O}}{\underset{\|}{\text{C}}}\text{N}\overset{\text{S}}{\underset{\|}{\text{C}}}$ Examples of suitable halides of structure VIII include, but are not limited to, the following:

$\text{CH}_3\text{O}\overset{\text{O}}{\underset{\|}{\text{C}}}\text{Cl}$ $\text{C}_4\text{H}_9\text{O}\overset{\text{O}}{\underset{\|}{\text{C}}}\text{Br}$ $\text{C}_6\text{H}_5\text{O}\overset{\text{O}}{\underset{\|}{\text{C}}}\text{Cl}$ $\text{CH}_3\text{C}_6\text{H}_4\text{O}\overset{\text{O}}{\underset{\|}{\text{C}}}\text{Br}$ $\text{C}_5\text{H}_{11}\overset{\text{O}}{\underset{\|}{\text{C}}}\text{Cl}$ $\text{C}_6\text{H}_5\overset{\text{O}}{\underset{\|}{\text{C}}}\text{Cl}$ The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The mercaptobenzimidazolyl ureas and thioureas described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular mercaptobenzimidazolyl urea or thiourea being employed, on the severity of the infection and on the particular species of animal to be treated. In general, the mercaptobenzimidazolyl ureas and thioureas exhibit anthelminthic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The mercaptobenzimidazolyl ureas and thioureas may be incorporated in the animal feeds, and this method of administration is preferred when the compounds are to be used prophylactically, in which case they are incorporated in the feeds at concentrations such that the animal will consume daily from about 10 to about 70 mg. of mercaptobenzimidazolyl urea or thiourea per kilogram of body weight.

The means employed for administering these cercaptobenzimidazolyl ureas and thioureas to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the mercaptobenzimidazolyl ureas and thioureas are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the mercaptobenzimidazolyl ureas and thioureas are mixed with a suspending agent such as bentonite and the solid product added to water just prior to administration. The preferred drenches in accordance with this invention contain from about 5–50% by weight of mercaptobenzimidazolyl urea or thiourea.

The mercaptobenzimidazolyl ureas and thioureas described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the mercaptobenzimidazolyl ureas and thioureas intimately dispersed in or admixed with an inert carrier or diluent, i.e. one that is nonreactive with respect to the mercaptobenzimidazolyl urea or thiourea and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate mercaptobenzimidazolyl urea or thiourea with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, mercaptobenzimidazolyl urea or thiourea is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the mercaptobenzimidazolyl ureas and thioureas may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

1-[3-(2-benzimidazolylthio)propyl]-3-phenyl-2-thiourea (A) 2-[(3-aminopropyl)thio]benzimidazole, dihydrobromide.—To a solution of 10 g. of 2-mercaptobenzimidazole in 15 ml. of ethyl alcohol, a solution of 15.1 g. of 3-bromopropylamine hydrobromide in 60 ml. of water is added and the mixture is refluxed for 3 hours. The solvent is evaporated in vacuo and the residue is crystallized from absolute alcohol to give 19.1 g. (71%) of needles of the above title, M.P. 272–274°.

*Analysis.*—Calcd. for $C_{10}H_{13}N_3S \cdot 2HBr$ (percent): C, 32.54; H, 3.55; N, 1.39; Br, 43.30. Found (percent): C, 32.31; H, 3.86; N, 11.20; Br, 43.08.

(B) 1-[3-(2-benzimidazolylthio)propyl]-3-phenyl-2-thiourea.—To a solution of 5.5 g. (0.015 mole) of 2-[(3-aminopropyl)thio]benzimidazole, dihydrobromide in 50 ml. of ethyl alcohol, alcoholic solution of potassium hydroxide is added until slightly basic. Phenyl isothiocyanate, 1.8 g. (0.015 mole) is added and the reaction mixture is stirred and refluxed for 1 hour. At the end of this period, the solvent is evaporated in vacuo, and the residue crystallized from dilute methyl alcohol to give 3.0 g. of the title compound, M.P. 161–163°. Recrystallization from dilute methyl alcohol gives an analytical sample M.P. 163–165°.

*Analysis.*—Calcd. for $C_{17}H_{18}N_4O_2$ (percent): C, 59.61; H, 5.30; N, 16.35. Found (percent): C, 59.63; H, 5.13; N, 16.08.

EXAMPLE 2

1-[3-(2-benzimidazolylthio)propyl]-3-p-nitrophenyl-2-thiourea

Following the procedure of Example 1B, but substituting an equivalent amount of p-nitrophenyl isothiocyanate for phenyl isothiocyanate, there is obtained the title compound, M.P. 172–173°.

*Analysis.*—Calcd. for $C_{17}H_{17}N_5O_2S_2$ (percent): C, 52.69; H, 4.42; N, 18.08. Found (percent): C, 52.89; H, 4.59; N, 18.18.

EXAMPLE 3

1-[3-[(5-nitro-2-benzimidazolyl)thio]propyl]-3-phenyl-2-thiourea (A) 5-nitro-2-[(3-aminopropyl)thio]benzimidazole, dihydrobromide.—Following the procedure of Example 1A, but substituting an equivalent amount of 5-nitro-2-mercaptobenzimidazole for 2-mercaptobenzimidazole, there is obtained 5-nitro-2-[(3-aminopropyl)thio] benzimidazole, dihydrobromide, M.P. 241–242°.

*Analysis.*—Calcd. for C₁₀H₁₂N₄O₂S·2HBr (percent): C, 29.00; H, 3.41; N, 13.53. Found (percent): C, 28.84; H, 3.43; N, 13.40.

(B) 1 - [3 - [(5 - nitro - 2 - benzimidazolyl)propyl]-3-phenyl-2-thiourea.—Following the procedure of Example 1B, but substituting an equivalent amount of 5 - nitro-2-[(3-aminopropyl)thio]benzimidazole dihydrobromide for 2-[(3-aminopropyl)thio]benzimidazole dihydrobromide, there is obtained the title compound, M.P. 153–155°.

*Analysis.*—Calcd. for C₁₇H₁₇N₅O₂CS₂ (percent): C, 52.69; H, 4.42; N, 18.08. Found (percent): C, 52.68; H, 4.58; N, 17.76.

EXAMPLE 4

3-cyclohexyl-1-[3-[[1-(cyclohexylcarbamoyl)-5-nitro-2-benzimidazolyl]thio]propyl]urea To a solution of 2.5 g. (0.01 mole) of 5-nitro-2-[(3-aminopropyl)thio]benzimidazole in 50 ml. of tetrahydrofuran, 2.5 g. (0.02 mole) of cyclohexyl isocyanate is added, and the mixture refluxed for 0.5 hour. The solvent is evaporated in vacuo, and the residue is crystallized from absolute alcohol to give the title compound, M.P. 155–156°.

*Analysis.*—Calcd. for C₂₄H₃₄N₆O₄S (percent): C, 57.35; H, 6.80; N, 16.72. Found (percent): C, 57.33; H, 6.63; N, 16.95.

EXAMPLE 5 TO 22

Following the procedure of Example 1A except substituting the haloalkylamine hydrobromide shown in column A and the mercaptobenzimidazole shown in column B of Table I below the aminoalkylthiobenzimidazole shown in column C is formed; and then following the procedure of Example 1B substituting the aminoalkylthiobenzimidazole of column C and the isocyanate or isothiocyanate of column D the product shown in column E is formed.

Table I

| | A | | B | | | C | | | | D | E | | | | | |
|---|---|---|---|---|---|---|---|---|---|---|---|---|---|---|---|---|
| | Z—Y—NH₂HBr | | (R)ₙ—[benzimidazole]—SH, R₂ | | | (R)ₙ—[benzimidazole]—S—Y—NH₂, R₂ | | | | R₁N=C=X | (R)ₙ—[benzimidazole]—S—Y—NH—C(=X)—NH—R₁, R₂ | | | | | |
| Ex. No. | Z | Y | n | R(position) | R₂ | R | R₂ | n | Y | X | R | R₂ | n | Y | R₁ | X |
| 5 | Cl | —(CH₂)₃— | ... | H | H | (¹) | (¹) | (¹) | (²) | O | (¹) | (¹) | (¹) | (²) | C₆H₅ | (³) |
| 6 | Br | —(CH₂)₄— | 1 | C₅H₁₁ (5) | C₃H₇ | (¹) | (¹) | (¹) | (²) | S | (¹) | (¹) | (¹) | (²) | [cyclohexyl] | (³) |
| 7 | Br | —(CH₂)₈— | 1 | C₆H₅ (6) | C₆H₅ | (¹) | (¹) | (¹) | (²) | S | (¹) | (¹) | (¹) | (²) | C₃H₇ | (³) |
| 8 | Br | —(CH₂)₁₂— | 1 | C₃H₇O (4) | p—CH₃—C₆H₄— | (¹) | (¹) | (¹) | (²) | O | (¹) | (¹) | (¹) | (²) | CH₃OC(=O) | (³) |
| 9 | Cl | —(CH₂)₁₅— | 1 | C₃H₇CNH— (5) O= | C₄H₉C(=O) | (¹) | (¹) | (¹) | (²) | S | (¹) | (¹) | (¹) | (²) | C₆H₅ | (³) |
| 10 | Br | [CH₂—CH(tetrahydrothiophenyl)—] | 1 | CN (5) | C₆H₅C(=O) | (¹) | (¹) | (¹) | (²) | O | (¹) | (¹) | (¹) | (²) | p—NO₂—C₆H₄— | (³) |
| 11 | Br | —(CH₂)₃—C(CH₃)₂—(CH₂)— | 1 | CF₃ (5) | CH₃ | (¹) | (¹) | (¹) | (²) | S | (¹) | (¹) | (¹) | (²) | C₇H₁₅ | (³) |
| 12 | Br | —CH₂— | 1 | Cl (7) | C₆H₅ | (¹) | (¹) | (¹) | (²) | | (¹) | (¹) | (¹) | (²) | [methyltetrahydrothiophenyl] | (³) |

See footnotes at end of table.

TABLE I—Continued

| | | | B | | | C | | | | D | | | E | | | | |
|---|---|---|---|---|---|---|---|---|---|---|---|---|---|---|---|---|---|
| Ex. No. | Z | Y | n | R(position) | R₂ | R | R₂ | Y | R₁ | R₁ | X= | X | n | R | R₂ | Y | X |
| 13 | Cl | -CH₂-C(C₂H₅)H- | 1 | C₆H₅C(=O) | H | (¹) | (¹) | (²) | CH₃- | | | S | (³) | (¹) | (¹) | (²) | (³) |
| 14 | Br | -CH₂-CH(C₃H₇)- | 1 | C₂H₅S-(5) | C₃H₇ | (¹) | (¹) | (²) | (thiophene) | | | S | (³) | (¹) | (¹) | (²) | (³) |
| 15 | Br | -CH-CH₂- (CH₃) | 1 | C₄H₉C(=O)-(6) | p-CH₃-C₆H₄ | (¹) | (¹) | (²) | C₅H₁₁C(=O)CH₃ | | | O | (³) | (¹) | (¹) | (²) | (³) |
| 16 | Br | -C(CH₃)₂-CH₂- | 1 | NO₂-(6) | H | (¹) | (¹) | (²) | CH₃-C₆H₄-CH₂- | | | S | (³) | (¹) | (¹) | (²) | (³) |
| 17 | Cl | -(CH₂)₂-CH(CH₃)- | 2 | -SCN (6) / CH₃ (5) | H | (¹) | (¹) | (²) | (cyclopropyl) | | | O | (³) | (¹) | (¹) | (²) | (³) |
| 18 | Cl | -CH₂- | 1 | C₆H₅C(=O)NH- | H | (¹) | (¹) | (²) | | | | O | (³) | (¹) | (¹) | (²) | (³) |
| 19 | Br | -(CH₂)₃- | 1 | (CH₃)₂N-(6) | H | (¹) | (¹) | (²) | C₂H₅ | | | S | (³) | (¹) | (¹) | (²) | (³) |
| 20 | Br | -(CH₂)₃- | 1 | (C₂H₅)₂NCH₂-(5) | H | (¹) | (¹) | (²) | C₄H₉ | | | S | (³) | (¹) | (¹) | (²) | (³) |
| 21 | Br | -(CH₂)₃- | 1 | CH₃OC(=O)-(5) | H | (¹) | (¹) | (²) | C₃H₇ | | | O | (³) | (¹) | (¹) | (²) | (³) |
| 22 | Br | -CH₂- | 1 | -NHCOOCH₃(5) | H | (¹) | (¹) | (²) | CH₃ | | | S | (³) | (¹) | (¹) | (²) | (³) |

¹ As in Column B.
² As in Column A.
³ As in Column D.

EXAMPLES 23 TO 32

Following the procedure of Example 4 except substituting the benzimidazole products of Examples 1, 2 and 5 and 16 to 22 (column E of Table I) as shown in column A of Table II and the isocyanate or isothiocyanate shown in column B, the product shown in column C is obtained.

in 100 ml. of tetrahdrofuran, a solution of 0.80 g. of acetyl chloride in 10 ml. of tetrahydrofuran is added followed by the addition of 1.1 ml. of triethylamine. The mixture is refluxed for 0.5 hr. on a steam bath. The solvent is removed in vacuo and the product crystallized from alcohol.

TABLE II

| Ex. No. | n | R(position) | Y | X | $R_1$ | (Ex. No.) | $R_5$ | X | n | R | Y | X | $R_1$ | $R_2$ |
|---|---|---|---|---|---|---|---|---|---|---|---|---|---|---|
| 23 | | H | $(CH_2)_3$— | S | $C_6H_5$ | 1 | $CH_3$ | O | (¹) | (¹) | (¹) | (¹) | (¹) | $CH_3NHC(O)$— |
| 24 | | H | $(CH_2)_3$ | S | p-$NO_2$—$C_6H_4$— | 2 | [S-furyl] | O | (¹) | (¹) | (¹) | (¹) | (¹) | [S-furyl]-NHC(S)— |
| 25 | | H | $(CH_2)_3$— | O | $C_6H_{13}$— | 5 | $C_6H_{13}$— | O | (¹) | (¹) | (¹) | (¹) | (¹) | $C_6H_{13}NHC(O)$— |
| 26 | 2 | $NO_2$ (6), $NO_2$ (7) | —C(CH₃)₂—CH₂— | S | $CH_3$ | 16 | $C_6H_5CH_2$— | S | (¹) | (¹) | (¹) | (¹) | (¹) | $C_6H_5CH_2NHC(S)$— |
| 27 | 2 | —SCN (6), $CH_3$ (5) | —$(CH_2)_2$—CH($CH_3$)— | O | $C_6H_5C(O)$ | 17 | $C_6H_5C(O)$ | S | (¹) | (¹) | (¹) | (¹) | (¹) | $C_6H_5C(O)NHC(S)$— |
| 28 | 1 | $C_6H_5C(O)NH$—(7) | —$CH_2$— | O | [thiiranyl] | 18 | $C_4H_9C(O)$ | S | (¹) | (¹) | (¹) | (¹) | (¹) | $C_4H_9C(O)NHC(S)$— |
| 29 | 1 | $(CH_3)_2N$ (6) | —$(CH_2)_2$— | S | $C_2H_5$ | 19 | $C_6H_5C(O)$ | S | (¹) | (¹) | (¹) | (¹) | (¹) | $C_6H_5C(O)NHC(S)$— |
| 30 | 1 | $(C_2H_5)_2NCH_2$ (5) | —$(CH_2)_3$— | S | $C_4H_9$ | 20 | p-$NO_2$-$C_6H_4$- | S | (¹) | (¹) | (¹) | (¹) | (¹) | p-$NO_2$—$C_6H_4$—NHC(S)— |
| 31 | 1 | $CH_3OC(O)$ (5) | —$(CH_2)_3$— | O | $C_6H_5$ | 21 | $C_6H_5$ | S | (¹) | (¹) | (¹) | (¹) | (¹) | $C_6H_5$—NHC(S)— |
| 32 | 1 | —NHCOOCH₃ (5) | —$CH_2$— | S | $CH_3$ | 22 | [thiophene] | O | (¹) | (¹) | (¹) | (¹) | (¹) | [thiophene]-NHC(O)— |

¹ As in Column A.

EXAMPLE 33

1-[3-[1-acetyl-5-nitro-2-benzimidazolyl)thio]propyl]-3-phenyl-2-thiourea

To a solution of 3.8 g. (0.01 mole) of 1-[3-[(5-nitro-2 - benzimidazolyl)thio]propyl] - 3 - phenyl-2-thiourea

EXAMPLES 34 TO 43

Following the procedure of Example 33 except substituting the benzimidazole product of Examples 1, 2 and 5 and 16 to 22 (column E of Table I) as shown in column A of Table III and the "R₂Hal" compound shown in column B, the product shown in column C is obtained.

TABLE III

| Ex. No. | n | R | Y | X | $R_1$ | (Ex. No.) | | n | $R_2$ | R | Y | X | $R_1$ |
|---|---|---|---|---|---|---|---|---|---|---|---|---|---|
| 34 | | H | —$(CH_2)_3$— | S | $C_6H_5$ | 1 | $CH_3OC(O)Cl$ | (¹) | | (¹) | (²) | (²) | (²) |
| 35 | | H | —$(CH_2)_3$— | S | p-$NO_2$-$C_6H_4$- | 2 | $C_6H_5OC(O)Br$ | (¹) | | (¹) | (²) | (²) | (²) |

See footnotes at end of table.

TABLE III—Continued

| Ex. No. | n | R | Y | X | R₁ | (Ex. No.) | B R₂Hal | n | R₂ | R | Y | X | R₁ |
|---|---|---|---|---|---|---|---|---|---|---|---|---|---|
| 36 | | H | —(CH₂)₂— | O | C₆H₁₃ | 5 | $C_2H_5\overset{O}{\overset{\|}{C}}Cl$ | (¹) | (¹) | (²) | (²) | (²) | (²) |
| 37 | 1 | NO₂ (5) | $-\overset{CH_3}{\underset{\|}{CH}}-CH_2-$ | S | CH₃ | 16 | $p\text{-}CH_3C_6H_4\overset{O}{\overset{\|}{C}}Br$ | (¹) | (¹) | (²) | (²) | (²) | (²) |
| 38 | 1 | CH₃ (5) | $-(CH_2)_2-\overset{CH_3}{\underset{\|}{CH}}-$ | O | $C_6H_5\overset{O}{\overset{\|}{C}}$ | 17 | $C_3H_7O\overset{O}{\overset{\|}{C}}Cl$ | (¹) | (¹) | (²) | (²) | (²) | (²) |
| 39 | 1 | $C_6H_5\overset{O}{\overset{\|}{C}}NH$ (7) | —CH₂— | O | 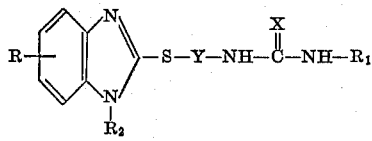 | 18 | $CH_3-\underset{}{\bigcirc}-O\overset{O}{\overset{\|}{C}}Br$ | (¹) | (¹) | (²) | (²) | (²) | (²) |
| 40 | 1 | (CH₃)₂N | —(CH₂)₃— | S | C₂H₅ | 19 | $C_5H_{11}\overset{O}{\overset{\|}{C}}-Cl$ | (¹) | (¹) | (²) | (²) | (²) | (²) |
| 41 | 1 | (C₂H₅)₂NCH₂ (5) | —(CH₂)₃— | S | C₄H₉ | 20 | $CH_3\overset{O}{\overset{\|}{C}}Cl$ | (¹) | (¹) | (²) | (²) | (²) | (²) |
| 42 | 1 | $CH_3O\overset{O}{\overset{\|}{C}}$ (5) | —(CH₂)₂— | O | C₆H₅ | 21 | $C_4H_9O\overset{O}{\overset{\|}{C}}Cl$ | (¹) | (¹) | (²) | (²) | (²) | (²) |
| 43 | 1 | —NHCOOCH₃ (5) | —CH₂— | S | CH₃ | 22 | $CH_3\overset{O}{\overset{\|}{C}}Cl$ | (¹) | (¹) | (²) | (²) | (²) | (²) |

¹ As in Column B.
² As in Column A.

What is claimed is:

1. A mercaptobenzimidazolyl urea or thiourea having the formula:

$$R-\underset{\underset{R_2}{|}}{\boxed{\begin{array}{c}N\\N\end{array}}}-S-Y-NH-\overset{X}{\overset{\|}{C}}-NH-R_1$$

wherein X is oxygen or sulfur, R is selected from the group consisting of hydrogen, lower alkyl, lower alkoxy, lower alkylthio, trifluoromethyl, nitro, halo, mono-lower alkyl amino and di-lower alkyl amino; R₁ is selected from the group consisting of lower alkyl, cycloalkyl of from 3 to 7 carbons, phenyl and phenyl substituted with nitro, halo or lower alkyl; R₂ is selected from the group consisting of hydrogen, lower alkyl, phenyl and benzyl; Y is straight chain alkylene of from 1 to 6 carbon atoms which may or may not be substituted by one or two alkyl groups of from 1 to 4 carbon atoms.

2. A mercaptobenzimidazolyl urea as defined in claim 1 wherein X is oxygen.

3. A mercaptobenzimidazolyl thiourea as defined in claim 1 wherein X is sulfur.

4. A mercaptobenzimidazolyl thiourea as defined in claim 1 wherein R is H, R₂ is H, Y is —(CH₂)₃—, X is S, R₁ is phenyl.

5. A mercaptobenzimidazolyl thiourea as defined in claim 1 wherein R is H, R₂ is H, Y is —(CH₂)₃—, X is S, and R₁ is p-NO₂—phenyl—.

6. A mercaptobenzimidazolyl thiourea as defined in claim 1 wherein R is 5-No₂, R₂ is H, Y is —(CH₂)₃—, X is S and R₁ is phenyl.

References Cited

FOREIGN PATENTS 1,155,450 10/1963 Germany ---------- 260—302 F
2,003,841 7/1970 Germany ---------- 260—309.2

NATALIE TROUSOF, Primary Examiner

U.S. Cl. X.R.

260—453 A, 454, 465 E, 471 R, 471 C, 562 R, 563 R, 570.8 R, 570.9, 574, 577, 578, 583 G; 424—273

UNITED STATES PATENT OFFICE
CERTIFICATE OF CORRECTION

Patent No. 3,718,662                     Dated February 27, 1973

Inventor(s) V. L. Narayanan and R. D. Haugwitz

It is certified that error appears in the above-identified patent and that said Letters Patent are hereby corrected as shown below:

Column 6, line 61, Example 2, "$C_2H_5\overset{O}{\overset{\|}{C}}$" should read -- $C_6H_5\overset{O}{\overset{\|}{C}}$ --. Column 7, line 35, " $Br-CH_2-\underset{C_2H_5}{\overset{CH_3}{\underset{|}{C}}}-(CH_2)_2-NH_2 HBr$ "

should read -- $Br-CH_2-\underset{C_2H_5}{\overset{CH_3}{\underset{|}{\overset{|}{C}}}}-(CH_2)_2-NH_2 HBr$ --.

Column 8, line 72, "cercaptobenzimidazolyl" should read -- mercaptobenzimidazolyl --. Column 10, line 36, "N, 1.39;" should read -- N, 11.39; --. Column 12, Table I, Column B, Example 12, "$C_6H$" should read -- $C_6H_5$ --.

Signed and sealed this 10th day of July 1973.

(SEAL)
Attest:

EDWARD M. FLETCHER, JR.
Attesting Officer

Rene Tegtmeyer
Acting Commissioner of Patents